(12) United States Patent
Hu

(10) Patent No.: US 7,216,229 B2
(45) Date of Patent: May 8, 2007

(54) METHOD BASED ON BORDER GATEWAY PROTOCOL MESSAGE FOR CONTROLLING MESSAGES SECURITY PROTECTION

(75) Inventor: Chunzhe Hu, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 760 days.

(21) Appl. No.: 10/443,512

(22) Filed: May 22, 2003

(65) Prior Publication Data

US 2003/0236898 A1    Dec. 25, 2003

(30) Foreign Application Priority Data

Jun. 5, 2002    (CN)    ................................ 02 1 20924

(51) Int. Cl.
    *H04L 9/00*    (2006.01)
(52) U.S. Cl. ..................................... 713/168
(58) Field of Classification Search ..................... None
    See application file for complete search history.

(56) References Cited

U.S. PATENT DOCUMENTS

| 5,511,122 | A  | * | 4/1996  | Atkinson ..................... | 713/153 |
| 6,339,595 | B1 | * | 1/2002  | Rekhter et al. ............. | 370/392 |
| 6,810,421 | B1 | * | 10/2004 | Ishizaki et al. ............. | 709/226 |
| 6,973,057 | B1 | * | 12/2005 | Forslow ..................... | 370/328 |

OTHER PUBLICATIONS

Lougheed et al., RFC 1267 Border Gateway Protocol 3 (BGP-3), Oct. 1991, pp. 2-9 & 12-25.*

Heffernan, Andy, "Protection of BGP Sessions via the TCP MD5 Signature Option," Mar. 12, 1998, IETF, pp. 1-3.*

* cited by examiner

*Primary Examiner*—Emmanuel L. Moise
*Assistant Examiner*—Nadia Khoshnoodi
(74) *Attorney, Agent, or Firm*—Merchant & Gould P.C.

(57) ABSTRACT

The present invention discloses a method based on Border Gateway Protocol message for controlling message security protection, the method comprises the communicating process of the authentication mechanism and the authentication word between the message sending side and the message receiving side. If the communicating is successful, the message receiving side will authenticate the 16-byte tag field in the BGP message head of the message sent by the message-sending side according to the authentication mechanism and the authentication word; after the BGP connection is established, the message-sending side will send a BGP message according to the former 16-byte tag field in the message head determined by the authentication mechanism and the authentication word, the message receiving side authenticates the received BGP message according to the determined former 16-byte tag field in the BGP message head, if it pass the authentication, the message will be received, otherwise the message will be abandoned; through said scheme, the BGP message head can be encrypted, even though the BGP message is intercepted illegally, the content is unavailable, and BGP session and the whole network will not be attacked according to content of the BGP message.

2 Claims, 3 Drawing Sheets

US 7,216,229 B2

METHOD BASED ON BORDER GATEWAY PROTOCOL MESSAGE FOR CONTROLLING MESSAGES SECURITY PROTECTION

BACKGROUND OF THE INVENTION

1. Field of the Invention

The present invention relates to a method for controlling messages security protection in network system.

2. Background of the Invention

The data security in Internet is an important task. For the core protocol—Border Gateway Protocol (BGP) of Internet, to ensure the security of routes and BGP connections is a serious problem due to a large quantity of routes transferred among domains. In detail, any interception, tampering, or reinsertion to BGP messages should be prevented to protect BGP connections, therefore data messages in network is protected. According to BGP protocol, a conventional BGP data message comprises 16-byte of full "1" plus content of BGP the message. Thus if the TCP connection is intercepted, the content of BGP messages can be obtained easily as long as the full "1" domain is analyzed out, therefore not only security of data messages but also that of the whole network system can not be guaranteed. For example, an attacker may acquire route information according to BGP message, modify the route information and reinsert in the TCP data-sending stream. If error route information is reinserted in, the BGP error processing will interrupt the connection, which will result in route oscillation in the public network. If an error route is reinserted in, a route trap will occur, which will increase traffic on some and attack the router until the router halts or reset. Therefore, there is hidden trouble in security in conventional transmission mechanism of data messages based on BGP message.

SUMMARY OF THE INVENTION

One object of the invention is to provide a method based on Border Gateway Protocol message for controlling message security protection, which benefits the security of data messages in Internet and that of network.

Accordingly, the present invention provides a method based on Border Gateway Protocol message for controlling message security protection, which comprises:

a. the message receiving side sends a connection-communicating message (OPEN message) comprising an authentication mechanism and an authentication word to the message sending side;

b. the message sending side determines whether to support the authentication mechanism and the authentication word of the connection-communicating message according to the received connection-communicating message and its own authentication capability. If yes, a support message is feedback to the message receiving side; otherwise a non-support message is feedback to the message receiving side;

c. if receiving the support message from the message sending side, the message receiving side determines the BGP message head of the message sent by the message sending side according to the authentication mechanism and the authentication word;

d. after the connection based on BGP is established, the message sending side sends a BGP message according to the BGP message head determined by the authentication mechanism and the authentication word;

e. the message receiving side authenticates the received BGP message according to the BGP message head determined in step c, and if the BGP message passes the authentication, receive the message, otherwise abandon it.

Said method also comprises:

determine the authentication mechanism based on Message Digest Algorithm 5 (MD5).

Determine the authentication word of a 16-byte random number.

The former 16-byte tag field of the message head is re-used as authentication word by the message sending/receiving sides to determine a new message head after the message receiving side receives the BGP message each time.

Because in the present invention, the tag field of the BGP message head is encrypted according to the authentication mechanism and the exchanged connection-communicating message (OPEN message) between the message sending/receiving sides, even though the BGP message is intercepted illegally, its content can't be obtained and the whole network can not be attacked according to content of the BGP message due to the unavailable head. Therefore, the present invention, together with TCP data stream, enables to protect BGP connection between the message sending side and the message receiving side, thus content of the BGP message and security of network is protected.

DETAILED DESCRIPTION OF THE EMBODIMENT

In the present invention: the message sending side and the message receiving side exchange the authentication word through OPEN message during establishment of the BGP connection. Thus through the communicating of message authentication, the former 16-byte tag field of the message head based on BGP protocol is modified, i.e., the tag field of BGP message head is dynamically encrypted, therefore the whole BGP message and the BGP connection are protected. Thus, although the attacker can intercept the BGP message from TCP message stream, he cannot obtain content of the BGP message due to the asynchronous message because the BGP head is unavailable.

The present invention will be described in further detail according to the following drawings.

Figure 1:
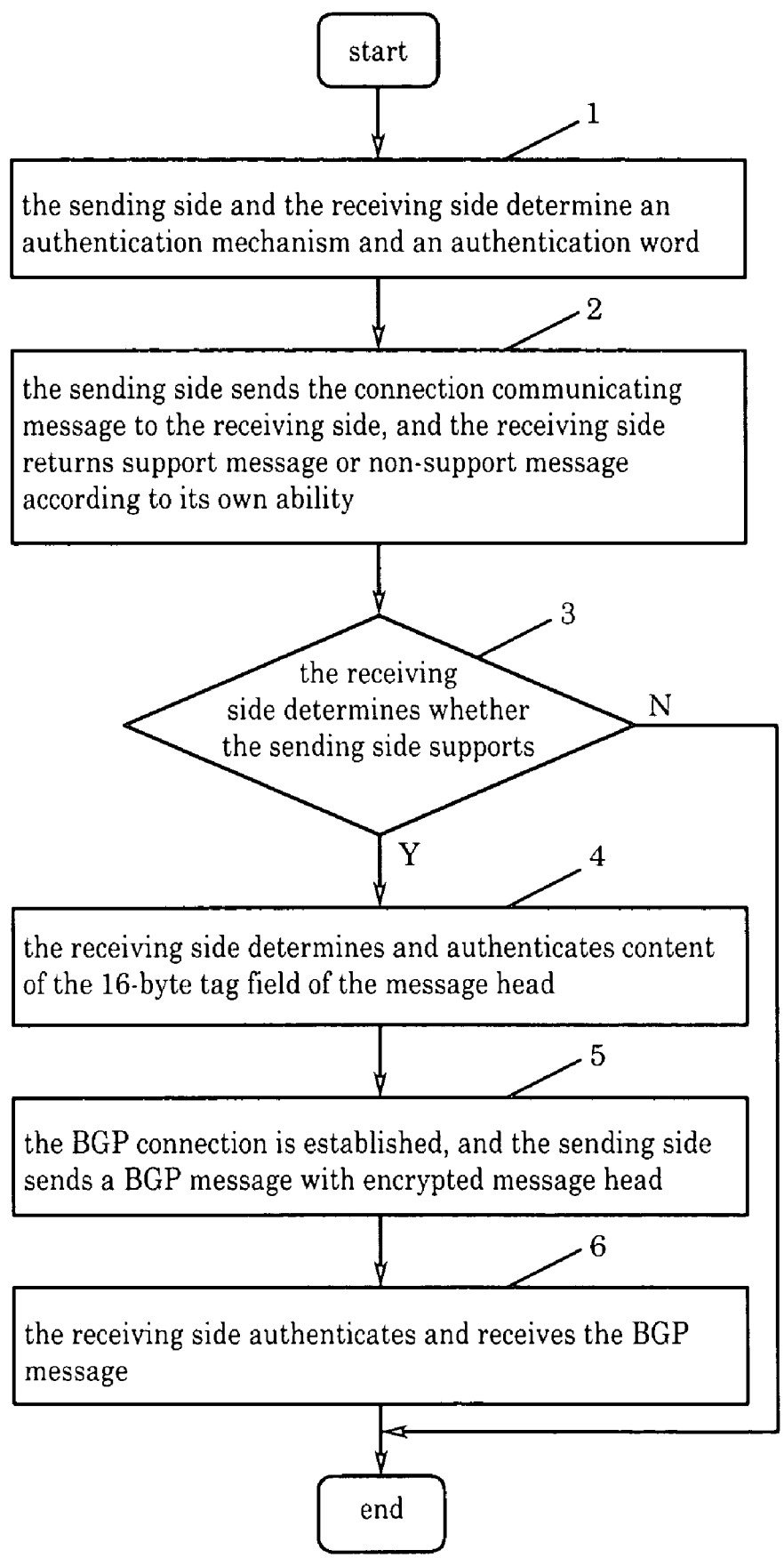
FIG. 1 is the flow chart of the embodiment of the present invention.
Figure 2:
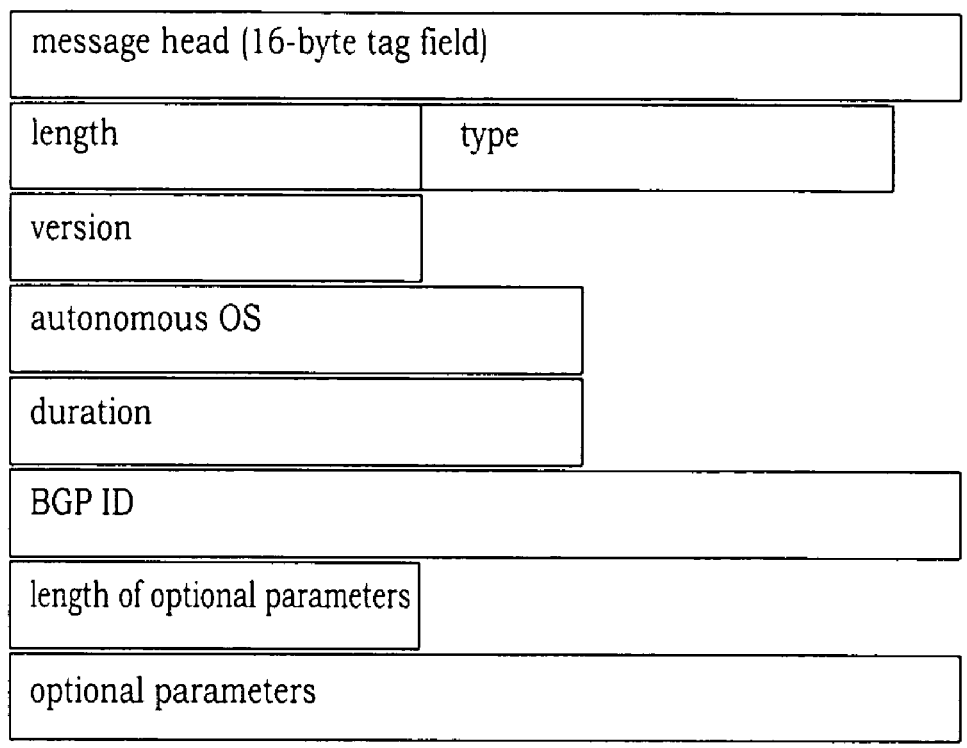
FIG. 2 is the structural diagram of OPEN message of the embodiment in FIG. 1.
Figure 3:
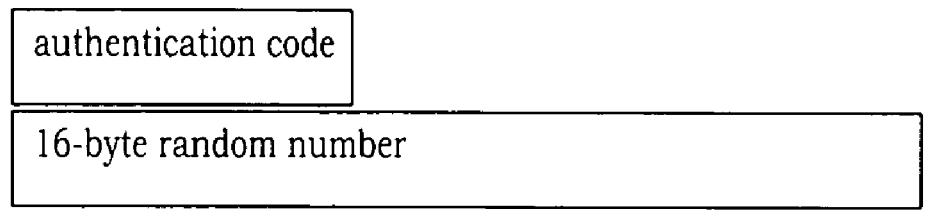
FIG. 3 is the optional parameters field diagram of structural diagram of OPEN message in FIG. 2.

FIG. 1 is the flow chart of the embodiment of the present invention. Referring to FIG. 1, first in step 1, the message receiving side sends a connection-communicating message (OPEN message) comprising an authentication mechanism and an authentication word to the message sending side. The content of said OPEN message can be determined according to communicating requirements. The format of OPEN message of the embodiment is shown in FIG. 2. OPEN message of FIG. 2 is used to establish BGP connection. Seen from FIG. 2, said message includes many parameters. In the present invention, the authentication mechanism and the authentication word are communicated through the message; the last parameter namely the optional parameter of the message is utilized. The format of said optional parameter is shown in FIG. 3, wherein the authentication code is used to identify or specify the authentication mechanism, and the 16-byte random number is used as the encryption authentication word. The OPEN message is used to carry the content of communicating, i.e., the authentication mechanism and the authentication word. In this embodiment, value of the authentication code is "1", specifying message authentication mechanism based on MD-5 encryption algorithm. The subsequent 16 bytes is a random number generated by the BGP message receiving side, serving as the authentication word.

In step 2, after receiving the OPEN message, the message sending side determines whether to support the authentication mechanism and the authentication word according to the OPEN message and its own authentication capability. If yes, the message sending side feedbacks a support message to the message receiving side; otherwise feedbacks a non-support message. In step 3, the message receiving side receives the feedback message by the message sending side, and determine whether the communicating with the message sending side is successful i.e., whether to support content of the communicating, according to the feedback message, if the received message is the support message, it indicates that the communicating is successful, and in step 4, determine BGP message head of the message sent by authentication message sending side according to the authentication mechanism and the authentication word, then continue step 5, otherwise the communication fails and sides.

In step 5, the BGP connection is established, and then the message sending side sends the BPG message according to the message head determined by the authentication mechanism and the authentication word.

In said step 4 and step 5, both the message sending side and the message receiving side determine content of the BGP message head according to the authentication mechanism and the authentication word. The message receiving side confirms whether the received BGP message is for itself according to the content; the message sending side sends the BGP message according to the content. The concrete confirming method is performed according to MD5 algorithm, referring to the following commands:

MD5 (OPEN type+code+16-byte random number);

Said code is a MD5 code configured by the message sending/receiving sides. The last 16-byte random number is the authentication word. At last, in step 6, the message receiving side authenticates the received BGP message according to the BGP message head determined in step 4. If the BGP message head passes authentication, the message will be received; otherwise it will be abandoned. That is to say, after the BGP connection is established, for the message sending side, 16 bytes of full "1" specified by BGP protocol should be replaced by a new message head to send all messages. After receiving the BGP message, the message receiving side confirms whether the message head is congruous. If no, abandon the message.

In said steps, step 1–step 4 are the communicating process, and they are performed only once before the BGP connection between the message sending side and the message receiving side is established, but after the communicating is accomplished successfully and the BGP connection is established, sending message and receiving message between the message sending side and the message receiving side will repeat.

It should be noted that the message sending side and the message receiving side are opposite. No matter which node serves as the message receiving side, the authentication mechanism and the authentication word used in each communicating with the message sending side may be different. In addition, the communicating process may be initiated by the message receiving side.

The disadvantage of the embodiment described in FIG. 1 is: the message head will not change after the connection is established, which may result in obtaining the message content through analyzing large quantity of intercepted data, thus to overcome said disadvantage, the former 16-byte tag field of the message head is re-used as authentication word by the message sending/receiving sides to determine a new message head after the message receiving side receives the BGP message each time, to have ability of changing to protect.

What is claimed is:

1. A method based on Border Gateway Protocol message for controlling message security protection comprising:
    a. a message receiving side sending a connection-communicating message comprising an authentication mechanism and an authentication word to the message sending side;
    b. the message sending side determining whether the authentication mechanism and the authentication word of the connection-communicating message is supported according to the received connection-communicating message and its own authentication capability, if yes, a support message being feedback to the message receiving side; otherwise a non-support message being feedback to the message receiving side;
    c. the message receiving side determining a BGP message head of the support message sent by the message sending side according to the authentication mechanism and the authentication word as receiving the support message from the message sending side;
    d. setting up the connection based on BGP, then the message sending side sending a BGP message according to the BGP message head determined by the authentication mechanism and the authentication word;
    e. the message receiving side authenticating the received BGP message according to the BGP message head determined in step c, and if the BGP message passes the authentication, receiving the message, otherwise abandoning the message and the method further comprising:
    determining the authentication mechanism based on Message Digest Algorithm 5 (MD5), referring to the following commands:
    MD5 (Open type+code+16-byte random number), where the +sign indicates a concatenation among each segment listed in the command;
    said code is an MD5 code configured by the message sending or receiving sides, and the last 16-byte random number is the authentication word.

2. The method of claim 1 further comprising: the former 16-byte tag field of the message head being re-used as the authentication word by the message sending/receiving sides to determine a new message head after the message receiving side receives the BGP message each time, and with BGP dynamic capability negotiation, the authentication code can be changed without breaking the BGP connection.

* * * * *